(No Model.) 2 Sheets—Sheet 2.

J. B. & J. D. THOMPSON.
CAR FENDER.

No. 574,462. Patented Jan. 5, 1897.

Witnesses.
Chas. H. Baker
R. A. Balderson

Inventors:
Joseph Baxter Thompson
John Dockery Thompson

UNITED STATES PATENT OFFICE.

JOSEPH BAXTER THOMPSON AND JOHN DOCKERY THOMPSON, OF PHILADELPHIA, PENNSYLVANIA.

CAR-FENDER.

SPECIFICATION forming part of Letters Patent No. 574,462, dated January 5, 1897.

Application filed July 31, 1895. Serial No. 557,789. (No model.)

*To all whom it may concern:*

Be it known that we, JOSEPH BAXTER THOMPSON and JOHN DOCKERY THOMPSON, citizens of the United States, residing in Philadelphia, (Germantown,) in the county of Philadelphia and State of Pennsylvania, have invented a new and useful Improvement in Car-Fenders, of which the following is a specification.

Our invention relates to improvements in car-fenders; and the object of our invention is to provide a fender that will protect the people from being crushed beneath the wheels of electric, cable, or other cars in that it is so constructed that when a person is struck by it they will be either thrown off the track or be compelled to fall into the fender, thereby under ordinary circumstances saving life and limb. The framework of the fender will be constructed of iron, which assures its durability and strength. We attain these objects by the mechanism illustrated in the accompanying drawings, in which—

Figure 1:
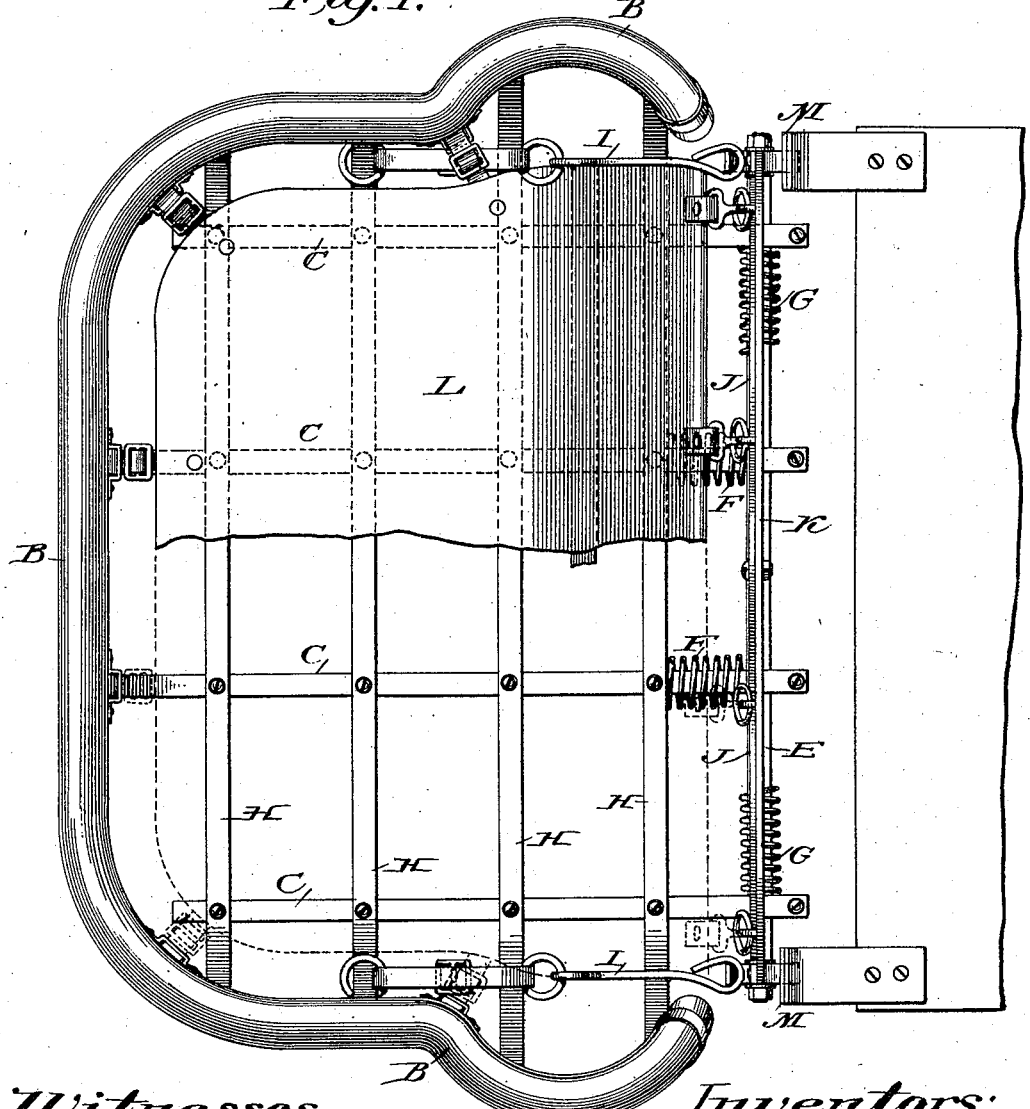
Figure 2:
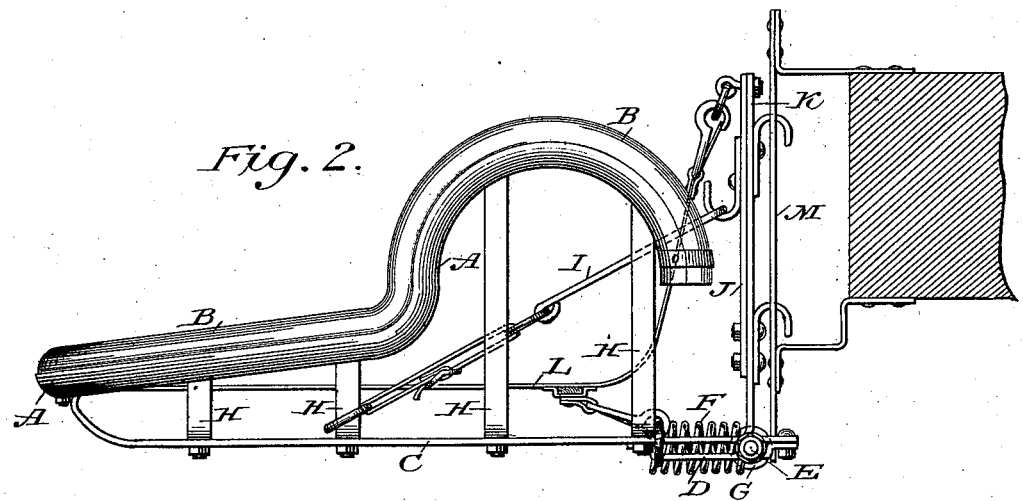
Figure 3:
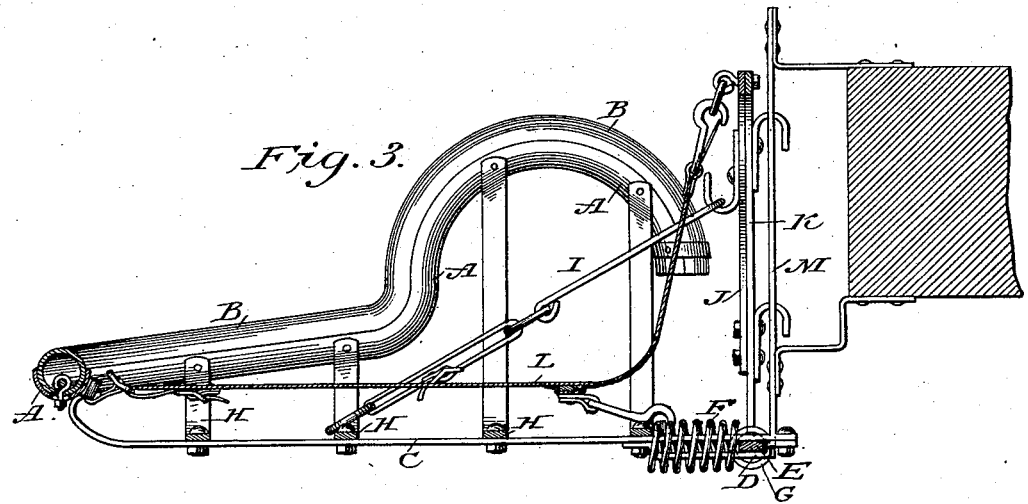

Figure 1 is a top view of the entire fender as it appears in position, showing the curved shape of tubing B as attached to rim A, also the shape of apron L and its attachment to rim A. Fig. 2 is a side elevation of fender, showing shape of curved rim A and cushion-tubing B, also showing position of frame K as connected with bar H on Fig. 1. Fig. 3 is a vertical section of the fender of the inner side of the rim A, showing the manner of connection of the bars H to the rim A and to bars C, also the position of apron L and the suspension-rod I, also the position of fender as attached to car.

A is the rim, constructed of plate-iron made in shape of forty-hundredths (40-100) part of a circle, as shown on drawings Figs. 2 and 3, with all proper slots and holes to fasten the cushion to the same, also to fasten the bars C and H, and leather straps for apron.

B is the cushion-tubing shown in Figs. 1, 2, and 3, made of rubber or other flexible material, placed around the rim A in such a position that it will lessen the force or shock of the fender coming in contact with any person or object.

C are four bars running from front to back of fender, connected to bar E, Figs. 1, 2, and 3, by plates D, forming slots to slide on bar E.

D are four plates on under side of plate C, Figs. 2 and 3.

E is a lower bar or axle of frame K, extending through slots on bars C, Figs. 1, 2, and 3.

F are two springs placed on end of bars C, bringing fender back to its original position when struck in front by any object, Figs. 1, 2, and 3.

G are two springs placed on bar E of frame K, holding bars C in position and replacing the fender when struck on either side, right or left, Figs. 1, 2, and 3.

H are cross-bars on Figs. 1, 2, and 3, bolted to bars C, forming braces for fender and turning up at each end and attached to and supporting rim A.

I are the two suspension-rods and leather straps connected together by bar, buckle, and end of rod attached to hook at top of frame K, and the strap end being fastened by buckle to ring on bar H close to rim A, thus supporting the fender in front in position, and also enabling any one to raise or lower the front of fender at will. (See Figs. 1, 2, and 3.)

J is a curved brace across frame K, Figs. 1, 2, and 3.

K is the upright frame, on which hooks are attached connecting with suspension-rod I and leather straps supporting front of fender; also, hooks are attached to back part of frame K, holding in position the fender to the attachments on platform of car. On the lower end of frame K there is formed an eye, through which passes a journal on ends of bar E and secured by a nut, thus forming a hinge on both sides by which the fender can be folded in front of car when not in use. (See Figs. 1, 2, and 3.)

L is an apron made of heavy canvas or other material and attached to the outer rim A of the fender by buckles and straps and to the top of frame K by rings and snaps, also connected underneath with rings and snaps, thus holding it in position, thus forming a bed to receive a person tripped up or thrown in the fender, keeping and protecting them from falling on the ironwork of fender. (See Figs. 1, 2, and 3.)

M are two iron plates with two slots, as shown in drawings, fastened to braces by bolts, and adjusted to car-platform, Figs. 1, 2, and 3.

What we claim as our invention, and desire to secure by Letters Patent, is—

1. A fender or guard for railway-cars constructed substantially as herein shown and described, consisting of a curved, concave-convex metal plate bent to form the rim of the said guard, an elastic tube secured in the upper and concave face of said plate, a cross-bar or axle, journaled in hangers depending from the end of the car, bars extending longitudinally from front to rear of fender and connected by means of slotted plates with said cross-bar, spiral springs on the rear ends of the longitudinal bars to operate against longitudinal motion of the fender, spiral springs on the axle-bar to operate against lateral motion of the fender, cross-bars with turned-up ends, connecting with the concave-convex plate and serving as braces to the fender, fender-supporting rods and straps, a frame attached to the car end for attachment of the fender, and a canvas apron covering the face of the fender, all arranged as set forth.

2. The combination with a railway-car of a guard constructed as herein shown and described, consisting of a curved concave-convex plate forming the front and side rims of the guard, an elastic tube secured to the upper face of said rim and coextensive with the same; cross-bars and longitudinal bars attached to each other and to the front and side rims of the frame and to a rear cross-bar, hangers for supporting the device from the platform of the car, and spiral springs interposed between the rear hangers and the next forward thereof, substantially as shown and described.

JOSEPH BAXTER THOMPSON.
JOHN DOCKERY THOMPSON.

Witnesses:
CLARENCE F. HART,
WILLIAM W. DAVIS.